No. 817,645. PATENTED APR. 10, 1906.
C. E. KEEL.
ELLIPSE COMPASSES.
APPLICATION FILED JUNE 19, 1905.
2 SHEETS—SHEET 1.
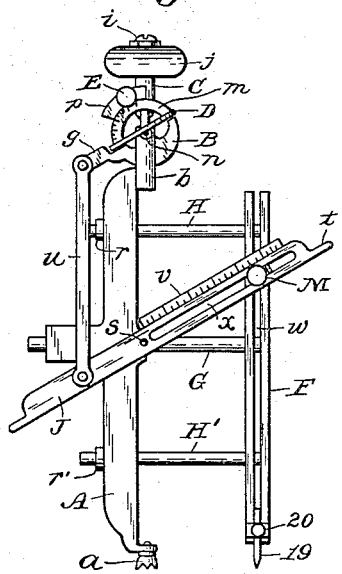
Fig. 1.
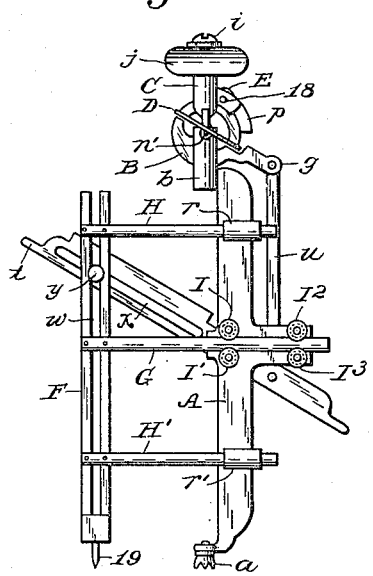
Fig. 2.
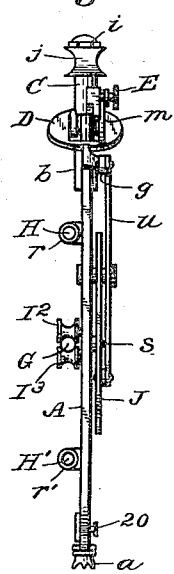
Fig. 3.
Fig. 4.
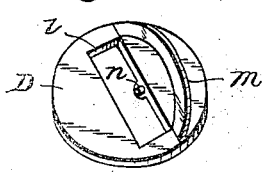
Fig. 5.
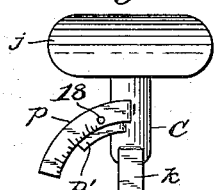
Fig. 6.
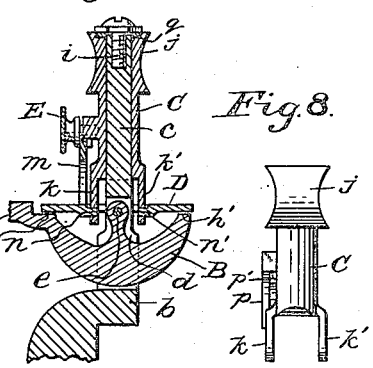
Fig. 7.
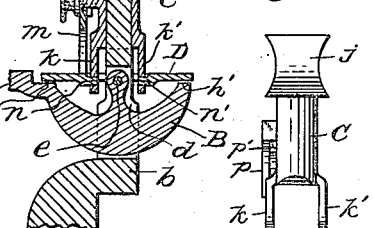
Fig. 8.
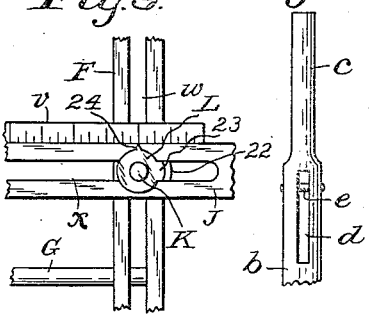
Fig. 9.
Fig. 10.
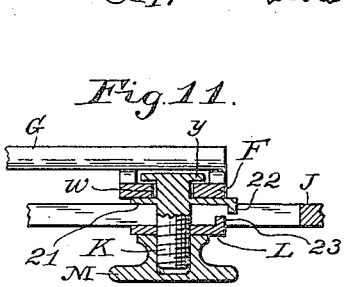
Fig. 11.
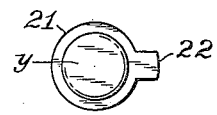
Fig. 12.
Witnesses:
Wm E Thompson
Helen T Bruse
Inventor:
Charles E. Keel,
by
E. T. Silvius,
Attorney.

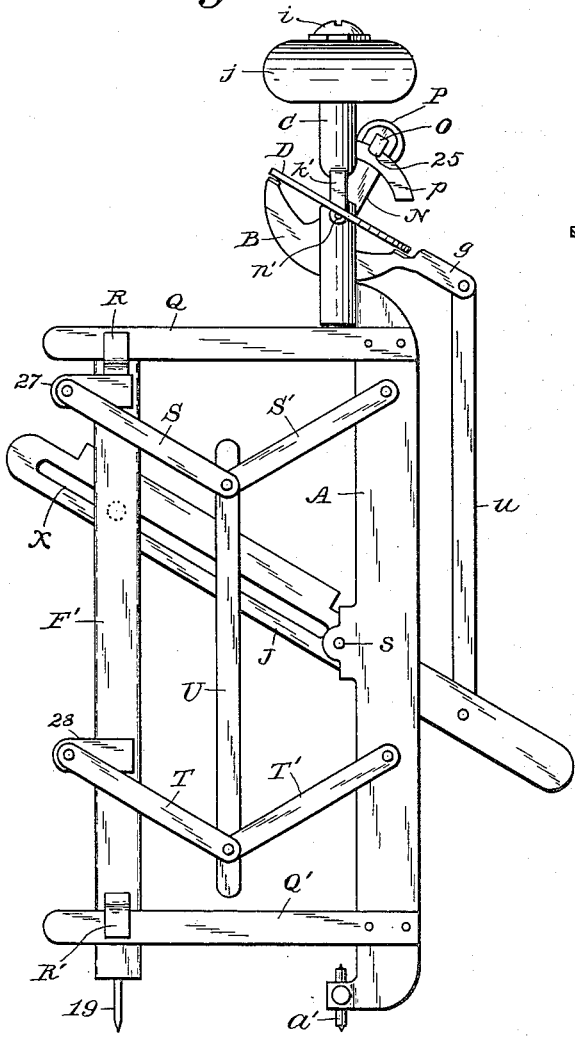
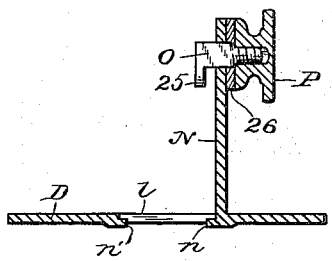
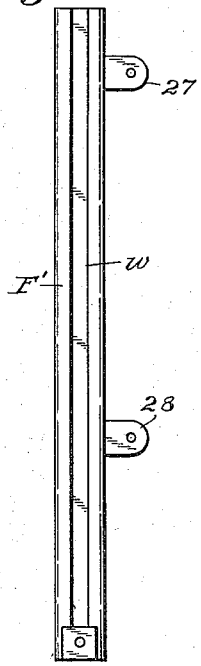
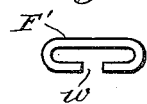

UNITED STATES PATENT OFFICE.

CHARLES E. KEEL, OF INDIANAPOLIS, INDIANA.

ELLIPSE-COMPASSES.

No. 817,645.   Specification of Letters Patent.   Patented April 10, 1906.

Application filed June 19, 1905. Serial No. 265,873.

*To all whom it may concern:*

Be it known that I, CHARLES E. KEEL, a citizen of the United States, residing at Indianapolis, in the county of Marion and State of Indiana, have invented new and useful Improvements in Ellipse-Compasses; and I do declare the following to be a full, clear, and exact description of the invention, reference being had to the accompanying drawings, and to the letters and figures of reference marked thereon, which form a part of this specification.

This invention relates to drawing instruments, and has reference particularly to compasses for drawing elliptical figures as well as for drawing circles.

An object of the invention is to provide an elliptic compass which may be quickly adjusted so that an ellipse of any size and proportion may be drawn accurately.

Another object is to provide an elliptic compass which may be quickly adjusted so as to be used for drawing circles with the same advantages as with a beam-compass within the range of capacity of the instrument.

The invention consists in an ellipse-compass comprising a pair of legs that are parallel and adjustable one to the other, one being the centering-leg and the other one the drawing-leg, a swivel-head on the centering-leg having an adjustable guide pivoted thereto, a beam pivoted to the centering-leg and controlling the positions of the drawing-leg with respect to the centering-leg, and a guide-arm and connection controlling the beam.

The invention consists, further, in the novel parts and in the combinations and arrangements of parts, as hereinafter particularly described and claimed.

Referring to the drawings, Figure 1 represents a front elevation of the instrument constructed substantially in accordance with the invention; Fig. 2, a rear elevation thereof; Fig. 3, a side elevation thereof; Fig. 4, a side elevation of the guide-arm; Fig. 5, a perspective view of the guide; Fig. 6, a front elevation of the swivel-head; Fig. 7, a vertical central sectional view of the swivel-head and upper portions of the centering-leg, showing the pivoting of the guide and the guide-arm; Fig. 8, a side elevation of the swivel-head; Fig. 9, a fragmentary front elevation showing portions of the drawing-leg and the beam; Fig. 10, an elevation of the upper portion of the centering-leg; Fig. 11, a sectional detail view showing the connections between the drawing-leg and the beam; Fig. 12, an end view of the guide-bolt for connecting the drawing-leg and the beam together adjustably and movably; Fig. 13, a rear elevation of the instrument, slightly modified in details; Fig. 14, a sectional detail view of the guide having modified securing devices; Fig. 15, a front elevation of the drawing-leg included in Fig. 13, and Fig. 16 an end view of the drawing-leg shown in Fig. 13.

Similar reference characters in the several figures of the drawings designate corresponding elements or features.

In the drawings, A designates the centering-leg, which is provided with either a crowfoot point $a$ or a needle-point $a'$, as may be desired, at one end thereof, the opposite or upper end $b$ of the leg having a spindle $c$ and also a slot $d$ and a pivot $e$, extending through the slot. A guide-arm B, having a pivot-hole $f$, is thereby mounted on the pivot $e$, extending through the slot $d$. The guide-arm has a finger $g$ and also two contact-blades $h$ and $h'$. A cap-screw $i$ is inserted in the end of the spindle $c$.

The swivel-head C comprises a bored body mounted rotatively on the spindle $c$ and having at one end thereof a handle $j$ and at its opposite end a pair of jaw-blades $k$ and $k'$, each having a pivot-hole 17 therein. A sector $p$, having a lip $p'$, is attached to the body of the head, the sector having also a screw-hole 18 therein to receive a binding-screw.

The guide D comprises a circular plate having an aperture $l$ therein and provided with a sector $m$, a pair of pivots $n$ and $n'$ being attached to the body of the guide, so as to extend into the aperture $l$, which receives the blades $k$ and $k'$, the pivots entering the pivot-holes in the blades, whereby the guide is pivoted to the head, the sector $m$ engaging the lip $p'$ of the sector $p$, which supports a binding-screw E, that binds the sector $m$ against the lip after adjustments of the guide. The under side of the guide touches the blades $h$ and $h'$ of the guide-arm B and is held yieldingly thereto by an elastic washer $q$ between the top of the handle $j$ and the head of the screw $i$. It will be clear from the foregoing that the guide B may be set either at right angles or at various oblique angles to the axis of the swivel-head.

The drawing-leg F has a main guide-bar G and two secondary guide-bars H and H' secured thereto, all in parallel arrangement, extending laterally from the leg, the main guide-bar being between the other two guide-bars and supported and guided by rollers I and I' as a pair and I² and I³ as another pair mounted on the leg A, the secondary guide-bars being guided by bearings $r$ and $r'$, attached to the leg A, all of the guide-bars being closely fitted, so as to move longitudinally in their guides and serve to keep the leg F parallel to the leg A while being moved to or from it in operation.

A beam J is connected by a pivot $s$ to the leg A and extends across the leg F and preferably has finger-holds or handles $t$ at its ends, and a connecting-rod $u$ is pivoted to the finger $g$ of the guide-arm and also to the beam, so as to hold the beam parallel to the guide-arm. The beam is provided with a graduated scale $v$, extending along the upper side thereof, for measuring the spread of the legs.

The leg F has a guideway $w$ extending lengthwise thereof, and the lower end of the leg is provided with a pencil 19, held by a binding-screw 20, and the leg and binding-screw may be modified so as to be adapted to carry a stylographic pen in lieu of the pencil, as is obvious. A guide-bolt K has a T-head $y$ movable in the guideway $w$, and the bolt also has a flange 21, that bears against the leg F, the flange having a projection 22, that is bent into a slot $x$ in the beam J for preventing the bolt's turning when loose. A washer L is placed on the bolt against the beam and has a projection 23 extending into the slot $x$ to prevent rotation of the washer, which is provided with a pointer 24, extending to the scale $v$ of the beam. A binding-nut M is placed on the screw K for binding the screw to the beam J, the nut bearing directly against the washer L, the T-head of the bolt at all times being free to move in the guideway $w$ of the leg F upwardly and downwardly while in operation.

In some cases the leg F may be formed of two parallel bars suitably connected together, and in other cases the drawing-leg may be composed of sheet metal bent over, as the leg F', Figs. 13, 15, and 16, to form the guideway $w$.

When preferred, the lip $p'$ may be omitted from the sector $p$. The guide D may be provided with an arm N instead of the sector $m$ to coöperate with the sector $p$, the arm carrying a binding-screw O, having a hook 25 and a washer 26, and a binding-nut P on the screw O, the hook being adapted to engage the sector $p$ to secure the arm N thereto, and thus fix the guide D after adjustment. Either the sector $m$ or the sector $p$, or each one of them, may be provided with a graduated scale, as is obvious.

In lieu of the devices above described for maintaining the legs A and F or F' in parallel arrangement parallel bars S and S' and T and T' may be employed in pairs, one pair S and S' being pivoted together and to a connecting-bar U and the other pair T and T' being pivoted together and also to the bar U, the bars S' and T' pivoted to the leg A and the bars S and T pivoted to the leg F', (or to the leg F,) preferably by means of projections 27 and 28, attached to the leg and extending laterally therefrom. Also with the parallel bars may be employed guide-bars Q and Q', secured to the leg A and extending behind guides R and R', that are attached to the drawing-leg F', (or F.)

In practical use, the instrument being held uprightly, the binding-screw E or the nut P may be loosened so that the guide D may be free to move on its pivots. Then the beam J may be placed in the horizontal position, after which the binding-nut M may be loosened, so that the drawing-leg may be adjusted according to the scale $v$ to suit the diameter on the major axis of the ellipse that is to be described, after which the nut M should be tightened. Then the guide D should be adjusted at a suitable angle, so as to move the beam J, and thereby draw the drawing-leg toward the leg A the necessary distance to describe the minor diameter of the ellipse that may have been predetermined. Then the guide D should be fixed. Then an ellipse may be drawn if the handle $j$ of the swivel-head be held in one hand against rotation, while with the other hand the operator moves the drawing-leg about the other or centering-leg, which will be accomplished by reason of the contact-blades of the guide-arm B following the plane of the guide D and through the various connections moving the drawing-leg toward and from the centering-leg as the beam J rises and falls from the horizontal.

Having thus described the invention, what is claimed as new is—

1. An ellipse-compass including a centering-leg, a drawing-leg carried by and movable toward or away from the centering-leg, a head swiveled on the centering-leg and provided with an adjustable guide, a guide-arm pivoted to the centering-leg and controlled by the guide, a beam pivoted to the centering-leg and controlling the movements of the drawing-leg, and a connecting-rod pivoted to the guide-arm and also to the beam.

2. An ellipse-compass including a centering-leg having a head swiveled thereon, a guide mounted on the head and adjustable angularly with respect to the axis of the leg, a binding-screw for the guide, a guide-arm pivoted to the centering-leg in contact with the guide to be actuated thereby, a drawing-leg carried by the centering-leg and movable with respect thereto, a beam pivoted to the centering-leg controlling the movements of the drawing-leg and provided with a graduated scale, and a connecting-rod pivoted to the guide-arm and also to the beam.

3. An ellipse-compass including a centering-leg having a beam pivoted thereto, a drawing-leg carried by the centering-leg and movable with respect thereto, guides for the drawing-leg, a connecting-bolt secured adjustably to the beam and having movable connection with the drawing-leg longitudinally thereof, a head swiveled on the centering-leg and supporting a guide adjustably, and a guide-arm pivoted to the centering-leg and controlled by the guide and controlling the movements of the beam.

4. An ellipse-compass including a centering-leg having a slot therein, a guide-arm in the slot pivoted to the leg, a beam pivoted to the centering-leg, a connecting-rod pivoted to the guide-arm and also to the beam and maintaining the beam parallel to the guide-arm, a drawing-leg carried by the centering-leg and movable with respect thereto, a connection between the beam and the drawing-leg and controlling the movements of the leg, and a head swiveled to the centering-leg and having a plane-faced guide adjustably attached thereto in contact with the guide-arm and thereby controlling the movements of the beam and the drawing-leg when the head is held stationary and the centering-leg is rotated relatively thereto.

In testimony whereof I affix my signature in presence of two witnesses.

CHARLES E. KEEL.

Witnesses:
WM. C. THOMPSON,
E. T. SILVIUS.